July 18, 1939. J. D. STACK 2,166,185
MONITORING MEANS FOR SOUND RECORDERS
Filed Dec. 4, 1937
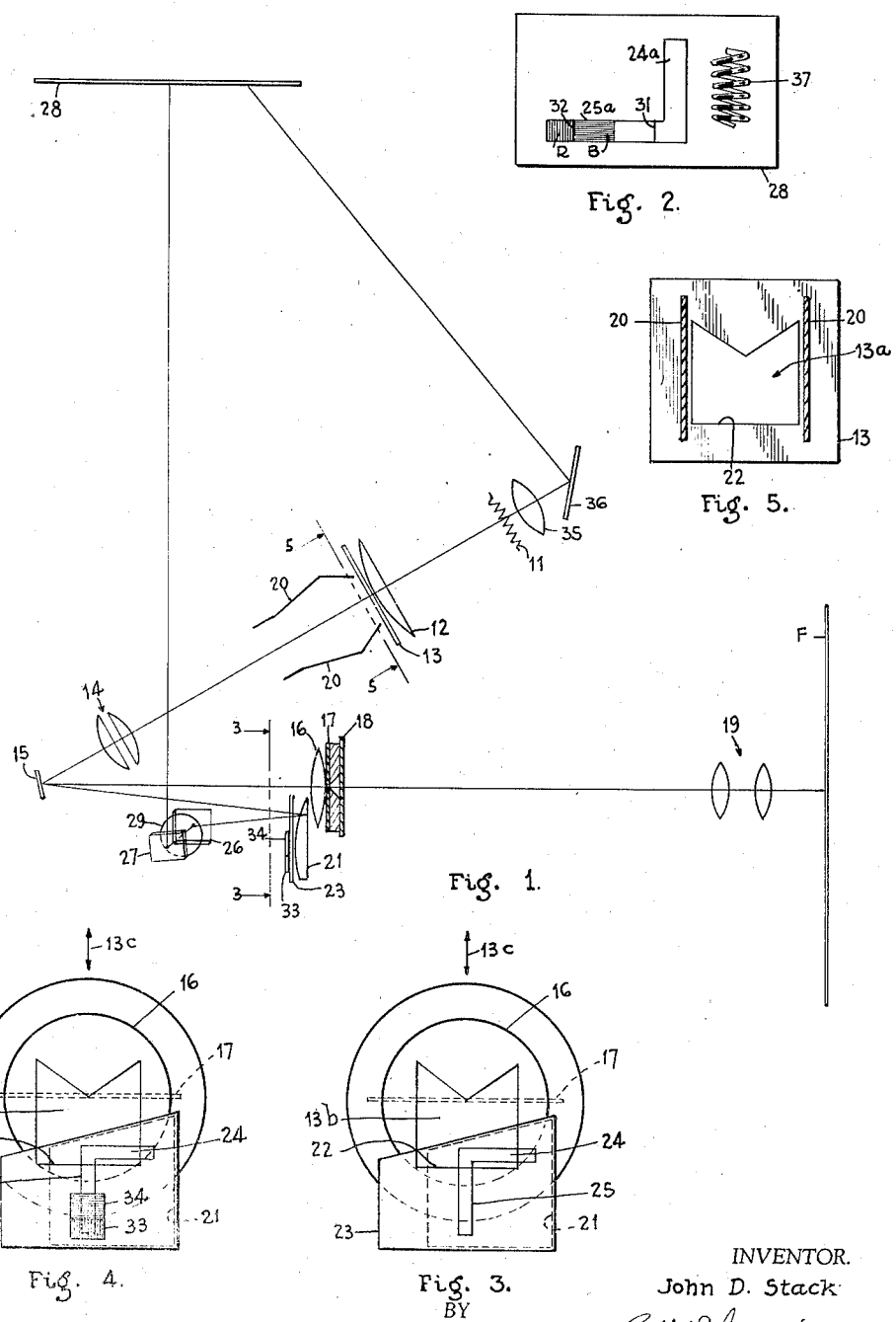
INVENTOR.
John D. Stack
BY
ATTORNEY.

Patented July 18, 1939

2,166,185

UNITED STATES PATENT OFFICE 2,166,185

MONITORING MEANS FOR SOUND RECORDERS

John David Stack, Los Angeles, Calif., assignor to Twentieth Century-Fox Film Corporation, Los Angeles, Calif., a corporation of New York Application December 4, 1937, Serial No. 178,097

7 Claims. (Cl. 179—100.3)

This invention relates to the art of electro-optically photographing sound and deals particularly with an improvement in the monitoring means commonly employed in a certain type of sound recorder.

Although the invention to be described hereinafter has been designed for and is applicable to a well known type of sound recorder and will be described and illustrated in connection therewith, nevertheless, the invention is not intended to be limited to the co-operative means shown and described nor should it be construed as being applicable to only one type of sound recorder.

Reference is made to a copending application filed by C. N. Batsel, Serial Number 177,907, filed Dec. 3, 1937, entitled Monitoring system.

The primary object of this invention is to provide a means that operates in conjunction with a visual monitoring means now employed on sound recorders of the type mentioned that will indicate pre-determined points of percentage of modulation by a conspicuous signal easily detected by the eye.

Another object of the invention consists in the provision of a plurality of signals of the above character one of which may be used to indicate one hundred per cent modulation and the other used to indicate a pre-determined level of modulation.

In the type of recorder above mentioned, the method of observing sound modulation consists in diverting a certain amount of the modulated light beam and projecting the same upon a monitoring card which is usually placed in a position easily observed by the eye. The operator notes the amount of modulation by observing the play of light over a path on the monitoring card. The only way in which he can detect over-loading or over modulation of the light metering means is by noting the point at which the light swings over a small line set at 100% modulation. This naturally requires a constant concentration on the part of the operator in order to detect the points of over modulation. In my invention I propose to change the color of the monitoring light at predetermined points of modulation. I accomplish this by using a filter of any desired color disposed in the path of the projected monitoring beam and arranged to intercept light from the beam as the beam swings to 100% modulation thus changing the color of the light upon the monitoring card at this point. I also contemplate using one or more colors of the above character and may so place these colors that one may indicate 100% modulation and the other may indicate any predetermined point of modulation, such as 50%. The result is a clear, vivid, color signal at these particular points which is easily and quickly detected by the eye without any concentration upon the card. The consequence of which is that all over modulation and particularly slight over modulation is readily and accurately seen without the usual eye strain and eye fatigue, due to concentration, and the operator is left freer to give his attention to other things.

Other objects and advantages will become apparent as the description proceeds in conjunction with the drawing in which:

Figure 1 is a schematic of the optical system employed in sound recorders of the type mentioned;

Figure 2 is a view of the monitoring card used in this system;

Figure 3 is a view taken on line 3—3, of Fig. 1, without my invention;

Figure 4 is a view similar to Fig. 3, showing the application of my invention, and Figure 5 is a view taken on line 5—5 of Fig. 1, showing the aperture mask.

In Fig. 1 of the drawing, I have shown a schematic arrangement of the optical system commonly employed in sound recorders of the above mentioned type.

In this system a light source 11, furnishes the light to be modulated by the sound. The means employed for this purpose comprises a collector lens 12, arranged to collect light from the source 11, and project the same through a mask 13, having an aperture 13a therein which is shown in Fig. 5. The image of the aperture 13a in the mask 13 is projected by an objective lens 14 onto a galvanometer mirror 15. Since the galvanometer is common in this art, it is sufficient to state that the mirror 15 vibrates in response to electrical waves in the system and the reflected image of the aperture 13a vibrates accordingly. The mirror 15 reflects the image of the aperture 13a through a collector lens 16 and the image thus reflected is focused upon a light slit 17. This image is shown in Figs. 3 and 4, and is designated 13b. The result is a beam of light projected from the mirror 15 to the slit 17 shaped by the aperture 13a. For ultra-violet recording, an ultra-violet filter 18 may be used behind the light slit. The image of the light slit is then focused upon a light sensitive film F, by means of an objective lens 19. As the mirror 15 swings in response to speech signals, the light beam is correspondingly swung and the image 13b, is oscillated in the direction of the arrow 13c. The upper V shaped edge of the image crossing over the slit 17 meters light to the film F. The foregoing is a brief description of the optical system used for recording modulated light upon a film. In a system of this nature there is also employed a noise reduction means which is schematically shown as a pair of vanes 20, which are commonly termed shutter vanes and operate in accordance with the envelope of the speech current to close off the unmodulated portion of the sound track. As before mentioned there is a visual monitoring system used in conjunction with this sound recording system. This may be best observed by referring to Fig. 3. Here it will be seen that the image of the aperture 13a of the mask 13 is focused upon the light slit 17. In front of the objective lens 16, a lens mirror 21 is placed so as to catch and reflect the bottom edge of the light beam corresponding to the bottom edge 22 of the image of the aperture 13a. In front of the mirror 21 there is placed a mask 23, having an L shaped aperture therein comprising legs 24 and 25. The leg 25 is for the purpose of indicating percentage modulation, and the leg 24 is for the purpose of indicating the movement of the shutter vanes 20 in response to noise reduction. The aperture legs 24 and 25 are projected by mirrors 26 and 27 onto a monitoring card 28 where they are designated 24a and 25a, respectively. A lens 29 is also placed between the mirrors 26 and 27 in this system. As the light beam formed by the aperture 13a moves up and down in the direction of the arrow 13c. In response to speech currents, the bottom edge of the beam, before mentioned, sweeps over the leg 25 and moving light is reflected from the lens mirror 21 onto the card 28 by means of the mirrors 26 and 27 and the lens 29. The movement of the light beam is directly observable on the card along the leg 25a to indicate the amount of modulation, and the noise reduction is seen on the leg 24a. Ordinarily there is shown upon the leg 25 small lines 31 and 32 which indicate zero modulation and 100% modulation respectively. In practice these lines are very thin black lines and can only be detected by close observation of the card during modulation. There may be other lines shown to indicate other points of modulation to be observed, that also requires attention.

In my invention I install a filter, preferably a gelatin filter 33, on the mask 23 over the aperture leg 25 at the point where the lower edge 22 of the image 13b reaches the 100% modulation point. This filter may be of any color conspicuous to the eye and may be mounted in any suitable manner. In practice I recommend a red filter. As an additional feature of my invention I may install another filter 34 on the same leg 25 of the aperture and may so place this filter that it will indicate a point of any percentage modulation by a change in the color of light at that point. This second filter should be of a contrasting color to the other filter 33, such as blue. For instance I may arrange the second filter to indicate a mean modulation or in other words, a 50% modulation. The result is that as the edge 22 of the light beam sweeps over the mask 23 in response to modulation, light will be projected from the leg 25 onto the monitoring card 28, and the leg 25a upon the card 28 will show a blue color designated "B" indicating the point of 50% modulation with an instant change of color to red "R" at the point of 100% modulation. Contrasting colors of this nature are conspicuous and are easily observable by the eye without concentration. With an arrangement of this nature an operator may give only casual attention to the monitoring card and observe modulation more closely than if he were forced to concentrate upon the card to observe the point at which a single line becomes visible.

In Fig. 1, I have also shown a means for projecting the image of the filament of the light source 11 upon the monitoring card 28. I accomplished this by positioning a lens 35 over the filament in such a manner that the image of the filament is projected upon a deflecting mirror 36 which directs the light rays onto the monitoring card 28 where the image appears in an enlarged form such as shown at 37. The purpose of this arrangement is to bring out an enlarged image of the light source in order that the filament may be observed at all times to ascertain if any of the coils are shorted out and are consequently dark. In this respect it is to be understood that it is highly essential that the light source has no dark zones which would cause a non-uniformity in the film density. This part of the invention is further disclosed and claimed in a copending application, Serial Number 178,098, filed Dec. 4, 1937, entitled Exciter light for sound recorders.

Although I have shown and described my invention in connection with an optical system used with a certain type of sound recorder and have shown a definite application of my invention to a particular point in this optical system nevertheless I am aware that it is possible and even practicable to apply my invention at other points in the optical system. I therefore, do not intend this invention to be restricted to the disclosure shown only in so far as limited by the prior art and the purview of the appended claims.

I claim:

1. In a sound recorder having means for projecting a portion of a sound modulated oscillating light beam upon a monitoring screen to produce visual indications of the oscillations of said beam, a mask having an aperture for shaping said projected light, a light filter arranged over said aperture adapted to change the color of the visual indications upon said screen at a predetermined level of sound modulation.

2. In a sound recorder employing a sound modulated light beam oscillated in response to sound vibrations, means for projecting light from said beam proportionally to the oscillations thereof upon a monitoring screen for visually indicating sound modulation, a mask having an aperture for shaping said projected light, and a light filter arranged over said aperture adapted to change the color of said projected light at a predetermined level of sound modulation.

3. In a sound recorder employing a light beam oscillated in response to sound vibrations, means for projecting light from said beam proportional to the oscillations thereof, a mask having an aperture for shaping said projected light, a monitoring screen for receiving said projected light and visually indicating thereon the amplitude of oscillation of said beam, and a filter arranged over said aperture to intercept said projected light and change the color of said visual indications at a predetermined amplitude of oscillation of said light beam.

4. In a sound recorder employing a light beam oscillated in response to sound vibrations, means for intercepting and projecting light from said beam proportional to the oscillations thereof, a monitoring screen for receiving said projected light and visually indicating thereon the amplitude of oscillation of said beam, a plurality of light filters arranged in the path of the projected light to intercept successive portions of said light, said filters being of contrasting color so as to change the color of the visual indications on said monitoring card correspondingly.

5. In a sound recorder employing a sound modulated light beam oscillated in response to sound vibration, said light beam having a defining edge that oscillates proportionally to sound modulations, a mirror positioned to intercept said defining edge and reflect the same upon a monitoring screen, a mask having an aperture for shaping said reflected light, and a light filter arranged over said aperture to change the color of the reflected light upon said monitoring screen as the defining edge of said light beam swings beyond a predetermined point, in response to sound modulation.

6. In a sound recorder employing a sound modulated light beam oscillated in response to sound vibration, said light beam having a defining edge that oscillates proportionally to said sound modulation, a mirror positioned to intercept said defining edge and reflect the same upon a monitoring screen, a mask in front of said mirror, said mask having an elongated aperture therein arranged to pass said defining edge, and a light filter mounted on said mask over said aperture to change the color of the reflected light from said mirror as the defining edge of said light beam swings beyond a predetermined point in response to sound modulation.

7. In a sound recorder employing a sound modulated light beam oscillated in response to sound vibrations, said light beam having a defining edge that oscillates proportionally to sound modulations, a mirror positioned to intercept said defining edge and reflect the same upon a monitoring screen, a mask in front of said mirror, said mask having an elongated aperture therein arranged to pass said defining edge, a pair of light filters mounted on said mask over said aperture, said filters being of contrasting colors and arranged to intercept said defining edge at successive points in the swing of said light beam so as to change the color of the reflected light upon said monitoring screen to indicate corresponding amplitude of sound modulation.

JOHN DAVID STACK.